US012300868B2

(12) United States Patent
Geslin et al.

(10) Patent No.: US 12,300,868 B2
(45) Date of Patent: May 13, 2025

(54) HOT HF COMPONENT WITH HF CAVITY

(71) Applicant: THALES, Courbevoie (FR)

(72) Inventors: Florian Geslin, Velizy-Villacoublay (FR); Pascal Girault, Velizy-Villacoublay (FR)

(73) Assignee: THALES, Courbevoie (FR)

( * ) Notice: Subject to any disclaimer, the term of this patent is extended or adjusted under 35 U.S.C. 154(b) by 250 days.

(21) Appl. No.: 17/926,455

(22) PCT Filed: May 18, 2021

(86) PCT No.: PCT/EP2021/063157
§ 371 (c)(1),
(2) Date: Nov. 18, 2022

(87) PCT Pub. No.: WO2021/233919
PCT Pub. Date: Nov. 25, 2021

(65) Prior Publication Data

US 2023/0187802 A1 Jun. 15, 2023

(30) Foreign Application Priority Data

May 20, 2020 (FR) ....................................... 2005239

(51) Int. Cl.
*H01P 1/30* (2006.01)
*H01P 3/12* (2006.01)
*H05H 7/18* (2006.01)

(52) U.S. Cl.
CPC .................. *H01P 3/12* (2013.01); *H01P 1/30* (2013.01); *H05H 7/18* (2013.01)

(58) Field of Classification Search
CPC ........ H01P 1/207; H01P 1/208; H01P 1/2082; H01P 1/211; H01P 1/30; H01P 1/00; H01P 3/12; H01P 3/123; H01P 3/127; H01P 3/13; H05H 7/18; H05H 7/20; H05H 2007/225
See application file for complete search history.

(56) References Cited

U.S. PATENT DOCUMENTS 4,918,049 A * 4/1990 Cohn ........................ H01P 3/12
505/701

FOREIGN PATENT DOCUMENTS

FR 2 621 439 A1 4/1989
SU 414760 A2 2/1974

OTHER PUBLICATIONS

Clemente, "The Room Temperature CH-DTL and its application for the FAIR Proton Injector", Dissertation, pp. 37-80, 2007.
Tan, et al., "Multi-Physics Analysis of a CW IH-DTL for CIFNEF", Proceedings of the 9th IPAC Conference, pp. 1129-1131, 2018.
Iwata, et al., "IH-DTL as a Compact Injector for a Heavy-Ion Medical Synchrotron", Proceedings of LINAC08, pp. 715-719, 2009.

* cited by examiner

*Primary Examiner* — Stephen E. Jones
(74) *Attorney, Agent, or Firm* — BakerHostetler

(57) ABSTRACT

A hot HF component equipped with an HF cavity which is delimited by a jacket includes at least one internal protrusion, the jacket comprising at least one internal canal following the contour of its internal surface to allow the flow of a heat transport fluid intended to remove heat energy originating from the cavity.

3 Claims, 3 Drawing Sheets

HOT HF COMPONENT WITH HF CAVITY

CROSS-REFERENCE TO RELATED APPLICATIONS

This application is a National Stage of International patent application PCT/EP2021/063157, filed on May 18, 2021, which claims priority to foreign French patent application No. FR 2005239, filed on May 20, 2020, the disclosures of which are incorporated by reference in their entirety.

The invention relates to a hot hyperfrequency or HF component having a hyperfrequency or HF cavity. What is meant by a hot HF component is a component of which the conducting materials operate in a normal resistivity domain (as opposed to the superconducting domain) or in other words, an HF component that is not a superconductor.

FIELD OF THE INVENTION

The invention notably applies to the HF components of particle accelerators. It also applies to any other hot HF component equipped with an HF cavity, such as circulators, magic Ts and loads.

Linear particle accelerators employ an electromagnetic field of the hyperfrequency HF type to accelerate the particles. These accelerators work with any type of charged particle but have the common feature of requiring the accelerator structures to be supplied with very high hyperfrequency power generally originating from an electron tube such as a klystron or a magnetron.

The main limitation of hot HF components is the management of the dissipation, as heat, of the power that the HF wave releases, through a Joule heating effect, into the accelerator structures.

The strong magnetic field at the surface of the cavities of the structure of the hot HF components gives rise to a significant release of energy. The resulting heating has a disruptive effect: as a result of the expansion of the metal, the resonant frequency of the cavity drops, and in a destructive effect: if the heating is excessively violent, it may lead to damage to the surfaces.

Furthermore, the resistivity of the material increases with temperature, and therefore the hotter the surface of the accelerator structure, the more energy is dissipated into it in the form of a Joule heating effect, and the greater the extent to which the surface becomes hotter.

At the present time, in order to limit such heating, the accelerator structures have passing through them canals or pipes in which the liquid coolant is circulated. This solution entails numerous machining operations and does not allow uniform cooling of the HF surfaces of the accelerator structure, particularly the regions deep within forming internal protrusions, such as irises and lips.

FIGS. 1 and 2 schematically depict an external view and a view in section of such an embodiment.

FIG. 1 schematically depicts a hot HF component 1 comprising a plurality of linear and rectilinear canals 2 positioned in the periphery of the jacket 3 of a cavity 4. The jacket 3 comprises internal protrusions 5. A heat transport fluid circulates through the canals 2 and removes the energy dissipated by Joule heating effect into the hot HF component 1.

FIG. 2 schematically depicts, viewed in section, such a canal 2 in a hot HF component 1.

FIG. 3 depicts an embodiment in which the internal protrusions 5 are irises, i.e. protrusions that narrow toward their end.

FIG. 4 depicts an embodiment in which the internal protrusions 5 are lips, i.e. protrusions that narrow and then flare out at their ends.

These solutions do not allow cooling as close as possible to the surface of the cavities, even though that is the region in which the heating is generated. The irises or lips of cavities in particular and the associated walls thereof which may be thin, depending on the type of inter-cavity HF coupling, are very far removed from the cooling canals. That produces hot spots in the structure which in turn disrupts the frequency tuning and causes mechanical stresses to appear.

SUMMARY OF THE INVENTION

It is an object of the invention to alleviate the abovementioned problems and notably to improve the cooling of an HF component.

Hence, one aspect of the invention proposes a hot HF component equipped with an HF cavity which is delimited by a jacket comprising at least one internal protrusion, said jacket comprising at least one internal canal following the contour of its internal surface to allow the flow of a heat transport fluid intended to remove heat energy originating from the cavity.

Such a component according to the invention allows cooling as close as possible to the entire HF surface, providing far better cooling of the HF component.

In one embodiment, the internal canal is flush with the internal surface of the jacket.

This then improves the cooling of the cavity.

According to one embodiment, an internal protrusion is a lip or an iris.

The present invention applies to any type of protrusion.

In one embodiment, the external part of the portions of the internal canal on the outside of the internal protrusions comprises an external cover layer.

Such an embodiment alleviates any manufacturing difficulties that there might be depending on the chosen geometry by separating the functions.

BRIEF DESCRIPTION OF THE DRAWINGS

The invention will be better understood by studying a number of embodiments described by way of entirely non-limiting examples and illustrated by the attached drawing in which.

Across all of the figures, elements that have identical references are similar.

DETAILED DESCRIPTION

Figure 1:
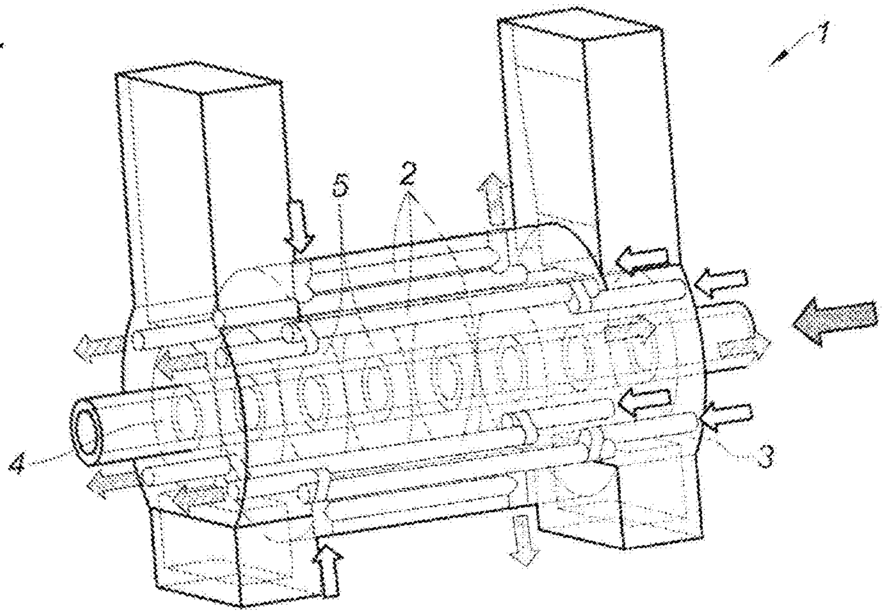
Fig. 1 PRIOR ART
FIG. 1 schematically illustrates a hot HF component equipped with an HF cavity, according to the prior art.
Figure 2:
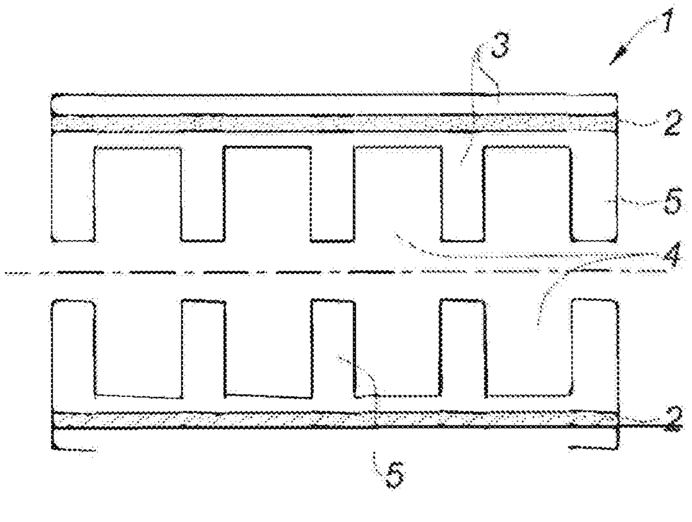
Fig. 2 PRIOR ART
FIG. 2 schematically illustrates a hot HF component equipped with an HF cavity, viewed in section, according to the prior art.
Figure 3:
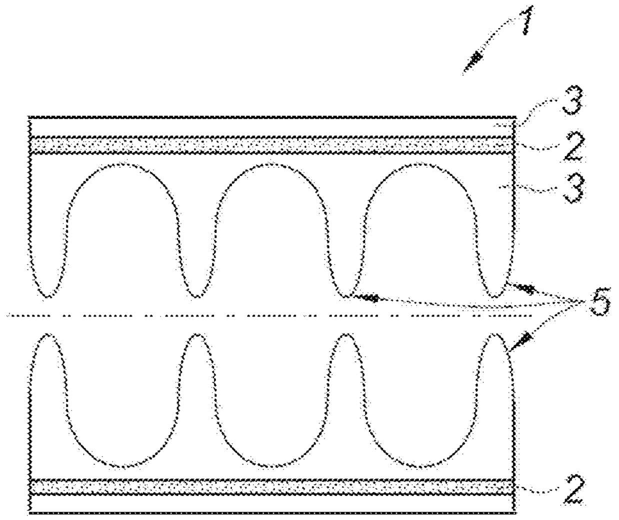
Fig. 3 PRIOR ART
FIG. 3 schematically illustrates a hot HF component equipped with an HF cavity, viewed in section, with iris-like internal protrusions, according to the prior art.
Figure 4:
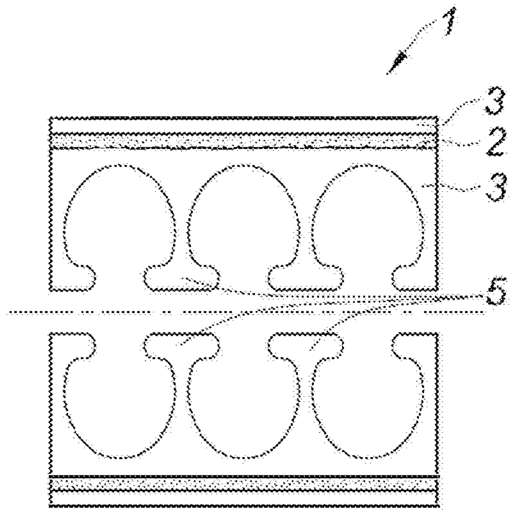
Fig. 4 PRIOR ART
FIG. 4 schematically illustrates a hot HF component equipped with an HF cavity, viewed in section, with lip-like internal protrusions, according to the prior art.
Figure 5:
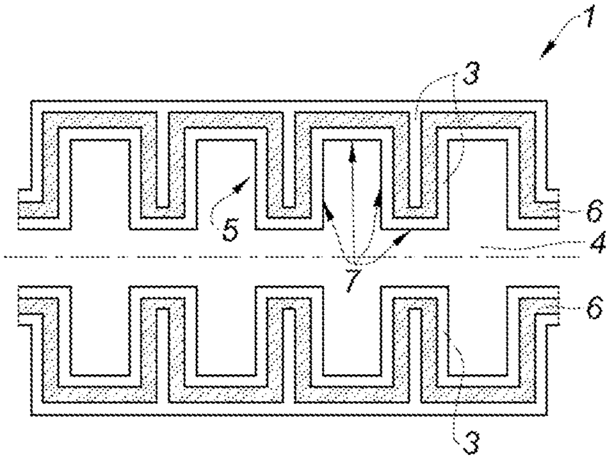
FIG. 5 schematically illustrates a hot HF component equipped with an HF cavity, viewed in section, according to one aspect of the invention.

FIG. 5 illustrates, according to one aspect of the invention, a hot HF component 1 equipped with an HF cavity 4 which is delimited by a jacket 3 comprising at least one internal protrusion 5. The jacket 3 comprises at least one internal canal 6 following the contour of its internal surface 7 to allow the flow of a heat transport fluid intended to remove heat energy originating from the cavity 4.

The internal canal 6 is flush with the internal surface 7 of the jacket 3.

What is meant by an internal canal 6 flush with the internal surface 7 of the jacket 3 is that part of the wall of the internal canal 6 forms part of the internal surface 7 of the protrusion. Its thickness is configured to take account of the mechanical stresses it is called upon to withstand.

An internal protrusion 5 may be a lip or an iris.

Figure 6:
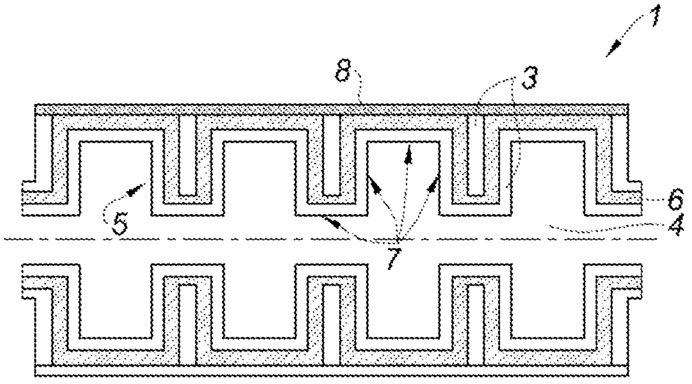
FIG. 6 schematically illustrates a hot HF component equipped with an HF cavity, viewed in section, according to another aspect of the invention.

FIG. 6 illustrates, according to one aspect of the invention, a hot HF component 1 equipped with an HF cavity 4 which is delimited by a jacket 3 comprising at least one internal protrusion 5. The jacket 3 comprises at least one internal canal 6 following the contour of its internal surface 7 to allow the flow of a heat transport fluid intended to remove heat energy originating from the cavity 4. The external part of the portions of the canal 6 on the outside of the internal protrusions 5 comprises an external cover layer 8.

The present invention allows the cavity to be cooled as close as possible to its surface, thereby making it possible to significantly improve the cooling of the hottest regions.

The invention claimed is:

1. A hot HF component equipped with a plurality of HF cavities which is delimited by a jacket comprising at least one internal protrusion, said jacket comprising at least one internal canal following the contour of its internal surface to allow the flow of a heat transport fluid intended to remove heat energy originating from the cavity, wherein the at least one internal protrusion is a lip or an iris.

2. The hot HF component as claimed in claim 1, wherein the internal canal is flush with the internal surface of the jacket.

3. The hot HF component as claimed in claim 1, wherein the external part of the portions of the internal canal on the outside of the internal protrusions comprises an external cover layer.

* * * * *